US006413598B1

(12) United States Patent
Motoki et al.

(10) Patent No.: US 6,413,598 B1
(45) Date of Patent: Jul. 2, 2002

(54) COVER MEMBER FOR ILLUMINATED PUSH BUTTON SWITCH AND METHOD FOR MANUFACTURING SAME

(75) Inventors: Toshihiro Motoki; Sadao Nakano, both of Nagano (JP)

(73) Assignee: Shin-Etsu Polymer Co., Ltd. (JP)

( * ) Notice: Subject to any disclaimer, the term of this patent is extended or adjusted under 35 U.S.C. 154(b) by 0 days.

(21) Appl. No.: 09/130,959

(22) Filed: Aug. 7, 1998

(30) Foreign Application Priority Data

Aug. 8, 1997 (JP) ............................................ 9-225578

(51) Int. Cl.[7] ........................... H01H 9/00; B32B 25/08

(52) U.S. Cl. ..................... 428/35.7; 428/36.8; 428/195; 200/314; 362/24; 362/28; 362/88

(58) Field of Search ............................... 428/35.7, 34.1, 428/36.8, 195; 200/314; 362/24, 28, 88

(56) References Cited

U.S. PATENT DOCUMENTS

| | | | | | |
|---|---|---|---|---|---|
| 5,234,744 | A | * | 8/1993 | Kenmochi | 428/195 |
| 5,573,107 | A | * | 11/1996 | Nakano et al. | 200/314 |
| 5,635,927 | A | * | 6/1997 | Lin | 341/22 |
| 5,655,826 | A | * | 8/1997 | Kouno et al. | 362/24 |
| 5,664,667 | A | * | 9/1997 | Kenmochi | 200/314 |
| 5,705,275 | A | * | 1/1998 | Nakano et al. | 428/413 |

FOREIGN PATENT DOCUMENTS

| | | |
|---|---|---|
| EP | 0 593 804 A1 | 4/1994 |
| EP | 0 772 213 A1 | 5/1997 |
| GB | 2 291 837 A | 2/1996 |
| JP | 5-83347 | 4/1993 |

* cited by examiner

*Primary Examiner*—Rena L. Dye
(74) *Attorney, Agent, or Firm*—Lerner, David, Littenberg, Krumholz & Mentlik, LLP

(57) ABSTRACT

A cover member for an illuminated push button switch capable of providing the hard touch with fingers when it is incorporated in a switch unit and facilitating formation of a symbol/character display section exhibiting distinct display and aesthetic properties. In the cover member, key tops each are provided at a distal end thereof with a hard resin section. The resin section is integrally mounted thereon with a rubber section and then a symbol/character display section is formed on a flat surface of the rubber section. The rubber section is fixed on the flat surface thereof to a movable section of a substrate. Such construction provides a user with a satisfactory feeling in operation, effectively prevents wearing of the symbol/character display section, provides the symbol/character display section with an aesthetic appearance without any defect and ensures increased durability of the cover member, resulting in a commercial value of the cover member being highly increased.

6 Claims, 3 Drawing Sheets

COVER MEMBER FOR ILLUMINATED PUSH BUTTON SWITCH AND METHOD FOR MANUFACTURING SAME

BACKGROUND OF THE INVENTION

This invention relates to a cover member for an illuminated push button switch which is used for a data input unit for a mobile communication equipment, a switch unit therefor or the like, and more particularly to a cover member wherein hard resin is applied onto a top surface of key tops to improve the touch with fingers and a method for manufacturing the same.

In a mobile communication equipment, an illuminated data input unit such as an illuminated push button switch has been used in order to meet the convenience of a night service. In general, such a data input unit is so constructed that press members are mounted directly on a circuit board which is provided thereon with fixed contacts, LEDs and the like. Also, the unit includes a cover member including a substrate made of an elastomeric rubber material and provided with a plurality of movable sections. The movable sections of the substrate each are provided on a front surface thereof with a key top and a rear surface thereof a movable contact.

Such a conventional cover member as described above is typically disclosed in Japanese Patent Laid-open Publication No. 5-83347. In the cover member disclosed in the patent, key tops each are made of a hard resin material and formed on a rear surface thereof with a punched character printed layer and a colored light-permeable printed layer. Also, the cover member includes key pads each made of a silicone rubber material and including an operation section and a non-operation section. The key pads each are bonded on a surface of the operation section thereof to each of the key tops.

In the cover member disclosed in the patent, it is considered that the key tops each are formed by charging a liquid resin composition in a die and heating it without applying a pressure thereto, to thereby cure it. Thus, the conventional cover member substantially fails to render a top or upper surface of each of the key tops flat, resulting in printing of the punched character printed layer and light-permeable printed layer being highly difficult, so that a display section fails to provide distinct display.

SUMMARY OF THE INVENTION

The present invention has been made in view of the foregoing disadvantage of the prior art.

Accordingly, it is an object of the present invention to provide a cover member for an illuminated push button switch which is capable of providing the hard touch with fingers when it is incorporated in a switch unit or the like.

It is another object of the present invention to provide a cover member for an illuminated push button switch which is capable of facilitating formation of a symbol/character display section exhibiting distinct display and aesthetic properties.

It is a further object of the present invention to provide a method for manufacturing a cover member for an illuminated push button switch which is capable of manufacturing a cover member accomplishing the above-described objects.

In accordance with a first aspect of the present invention, a cover member for an illuminated push button switch is provided. The cover member includes a substrate made of a light-permeable elastomeric rubber material and including a plurality of movable sections, as well as key tops arranged on the movable sections of the substrate, respectively. The key tops each include a rubber section made of a light-permeable elastomeric rubber material and a resin section made of a light-permeable hard resin material. The rubber sections each are fixed on a surface of each of the movable sections of the substrate and provided on a surface thereof fixed to the movable section with a display section. The resin sections each are fixed on a surface of the rubber section opposite to the surface thereof on which the display section is formed.

In a preferred embodiment of the present invention, the rubber sections fixed on the resin sections each include a flange arranged so as to radially outwardly extend from a lower end of an outer periphery of the resin section.

In a preferred embodiment of the present invention, the rubber sections each have hardness set between hardness of the substrate and that of the resin section.

In accordance with a second aspect of the present invention, a method for manufacturing a cover member for an illuminated push button switch is provided. The method includes the steps of pouring a flowable light-permeable hard resin composition into forming recesses of a forming die, curing the light-permeable hard resin composition in the forming recesses to form resin sections, pouring a flowable light-permeable rubber composition onto the resin sections in the forming recesses, curing the light-permeable rubber composition to form rubber sections of which one surface is fixed to the resin sections, respectively, forming a display section on the other surface of each of the rubber sections, forming a light-permeable rubber composition into a substrate including a plurality of movable sections, and bonding an upper surface of each of the movable sections of the substrate and the other surface of each of the rubber sections on which the display section is formed to each other by means of an adhesive.

In a preferred embodiment of the present invention, the display section is formed by providing a light-shielding colored layer formed with a symbol/character-like punched hole on the one surface of each of the rubber sections and charging a light-permeable colored layer onto the light-shielding colored layer in the punched hole.

Also, in accordance with the first aspect of the present invention, a cover member for an illuminated push button switch is provided. The cover member includes a substrate made of a light-permeable elastomeric rubber material and including a plurality of movable sections, as well as key tops arranged on the movable sections of the substrate, respectively. The key tops each include a rubber section made of a light-permeable elastomeric rubber material and a resin section made of a light-permable hard resin material. The rubber section has a flat surface through which the rubber section is fixed on a surface of each of the movable sections of the substrate and provided on the flat surface thereof fixed onto the movable section with a display section. The resin section is fixed on a surface of the rubber section opposite to the flat surface thereof on which the display section is formed. The substrate, rubber section and resin section are made so as to have Shore A hardness of 30 to 65, Shore A hardness of 60 to 80 and Shore D hardness of 50 to 80, respectively.

In a preferred embodiment of the present invention, the rubber section fixed on the resin section includes a flange arranged so as to radially outwardly extend from a lower end of an outer periphery of the resin section.

Further, in accordance with the second aspect of the present invention, a method for manufacturing a cover member for an illuminated push button switch is provided. The method includes the steps of pouring a flowable light-permeable hard resin composition into forming recesses of a forming die, curing the light-permeable hard resin composition in the forming recesses while heating it without applying a pressure thereto, to thereby form resin sections, pouring a flowable light-permeable rubber composition onto the resin sections in the forming recesses, curing the light-permeable rubber composition while heating and pressurizing it, to thereby form rubber sections of which one surface is fixed to the resin sections, respectively, forming the other surface of each of the rubber sections into a flat surface, forming a display section on the flat surface of each of the rubber sections by a screen printing means, forming a light-permeable rubber composition into a substrate including a plurality of movable sections, and bonding an upper surface of each of the movable sections of the substrate and the flat surface of each of the rubber sections to each other by means of a light-permeable adhesive.

Moreover, in accordance with this aspect of the present invention, a method for manufacturing a cover member for an illuminated push button switch is provided. The method includes the steps of charging a hard resin composition in forming recesses of a forming die, curing the composition without applying a pressure thereto to form resin sections of 50 to 80 in Shore D hardness, placing a rubber composition on the resin sections while keeping the resin sections in the forming recesses, subjecting the rubber composition to pressurizing and heating by means of the forming die, to thereby form rubber sections each having one surface adhered to each of the resin sections and the other surface formed into a flat surface and having 60 to 80 in Shore A hardness, resulting in providing a semi-finished product, and forming a symbol/character display section on the flat surface of each of the rubber sections while positioning and holding the semi-finished product. The symbol/character display section is constituted of a light-shielding colored layer and a light-permeable colored layer each formed by screen printing. The method also-includes the steps of subjecting a rubber composition to molding by means of a top force and a bottom force, to thereby form a substrate of 30 to 65 in Shore A hardness including a plurality of movable sections, applying a light-permeable adhesive to an upper surface of each of the movable sections of the substrate, and bonding the upper surface of each of the movable sections and the flat surface of each of the rubber sections to each other through the adhesive.

The cover member according to the present invention constructed as described above is combined with a circuit board to constitute an illuminated push button or a data input unit in cooperation with the circuit board. The circuit board is provided thereon with fixed contacts and light emitters such as LEDs or the like. The cover member includes the substrate wherein a plurality of movable sections each are contiguous to each of the base sections through a skirt section, as well as key tops respectively fixed on the movable sections of the substrate.

The substrate may be made of at least one selected from the group consisting of, for example, synthetic rubber materials such as urethane rubber, acrylic rubber, butyl rubber, silicone rubber, isoprene rubber and ethylene-propylene-diene terpolymer; natural rubber materials; light-permeable elastomeric rubber elastomers such as polyester and urethane thermoplastic elastomers; and the like. The movable sections each are provided on a rear surface thereof with a conductive movable contact in a manner to be contactable with the fixed contact on the circuit board. The substrate is formed while being heated and pressurized by means of a mold or die in a step separate from that of forming the key tops. For example, it may be formed of the above-described light-permeable rubber composition by compression molding, injection molding, injection compression molding or the like.

The key tops each include the light-permeable hard resin section, the light-permeable rubber section and a symbol/character display section formed on the rear surface of the rubber section which is a surface of the rubber section fixed to the movable section of the substrate (hereinafter also referred to "fixed surface"). The rubber sections each are adhered on the rear surface or fixed surface thereof to the movable section of the substrate by means of an adhesive. The resin sections each are formed into a layer-like configuration or a block-like configuration of a considerable thickness and made of a colored or colorless light-permeable resin having Shore D hardness (durometer hardness) of 50 to 80 such as acrylic resin, methacrylate resin, polyester resin, polycarbonate resin or phenyl methyl silicone resin. The resin sections may be normally formed by charging a liquid hard resin composition formable integrally with the rubber material for the rubber sections in forming recesses of a forming die and heating it without applying a pressure thereto, to thereby cure it. The resin compositions for the resin sections which is formable integrally with the rubber material include, for example, a material which is obtained by mixing thermosetting unsaturated polyester resin with a curing agent, a vinyl monomer acting as an adhesion promoter and epoxy resin promoting both an increase in mechanical strength and shrinkage prevention, as well as a material which is obtained by mixing high-hardness silicone resin such as dimethyl phenyl silicone resin or phenyl methyl silicone resin with a vinyl monomer.

The rubber sections each may be formed into a layer-like or laminar shape and made of a rubber elastomer or elastomeric rubber material similar to that for the substrate described above and preferably the same elastomeric rubber material as that for the substrate. Alternatively, it may be made of the same elastomeric rubber material as that for the substrate which has hardness of a level between hardness of the substrate and that of the resin section, such as, for example, silicone rubber. The cover member is preferably constructed so that the resin sections, substrate and rubber sections have Shore D hardness of 50 to 80, Shore A hardness of 30 to 65 and Shore A hardness of 60 to 80, respectively. Such construction increases resistance to peeling at an interface between the resin section and the rubber section and at that between the rubber section and the substrate and improves the touch with fingers. Desirably, the rubber sections, as described above, each are formed with the flange in a manner to slightly radially outwardly extend from a lower end of an outer periphery of a body thereof. The flange prevents leakage of light from an equipment on which the cover member is mounted. In order that the flange effectively prevents leakage of light from the equipment without increasing pitches of the key tops, it preferably extends by a distance of about 0.2 to 0.5 mm from the outer periphery of the resin section. Also, in order to ensure satisfactory release during the molding and prevent a deterioration in workability in printing of the symbol/character display section, it is preferably formed into a thickness of about 0.3 to 1.0 mm. For example, it is preferably formed into a thickness identical with or smaller than that of the rubber section.

The rubber sections, as described above, each are formed by charging the above-described light-permeable rubber composition onto the resin section received in each of the forming recesses and heating it while applying a pressure thereto, resulting in being fixed to the resin section. The rubber section is cut into a predetermined shape either after formation of the symbol/character display section thereon or before the formation. Desirably, the substrate and rubber sections are made of a silicone rubber elastomer, the symbol/character display section is made of a silicone ink by printing, and a silicone adhesive is used for adhesion between the substrate and the key tops. This ensures an increase in adhesion strength and an improvement in quality.

The symbol/character sections each may be formed by arranging the light-shielding colored layer formed with the punched hole indicating a symbol or character on the fixed surface of each of the rubber sections. Alternatively, it may be formed by arranging the light-shielding colored layer as described above and laminating the light-permeable colored layer on the light-shielding colored layer. The symbol/character display section may be formed by printing the light-shielding colored layer and light-permeable colored layer. For example, it may be formed by printing the layers by means of a screen printing machine or the like while securely holding the integrally bonded rubber section and resin section by means of a holding fixture.

Fixing of each of the key tops to the substrate is carried out by fixing the symbol/character display section of the rubber section on the top surface of the movable section of the substrate by means of a light-permeable (colored transparent or colorless transparent) adhesive. The adhesion may be carried out, for example, by previously applying the adhesive to the top surface of the movable section of the substrate by screen printing or the like, positioning the key top held by the holding fixture on the movable section of the substrate while holding the substrate at a predetermined position by means of a fixing fixture, and bonding the symbol/character display section of the key top onto the top surface of the movable section. Then, the holding fixture and fixing fixture are removed from the substrate having the key top fixed thereon and then the substrate is placed in a heating oven to cure the adhesive, leading to completion of the cover member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENTS

Now, a cover member for an illuminated push button switch according to the present invention will be described hereinafter with reference to the accompanying drawings.

Referring now to FIGS. 1 to 5C, an embodiment of a cover member for an illuminated push button switch and a method for manufacturing the same according to the present invention is illustrated.

Figure 1:
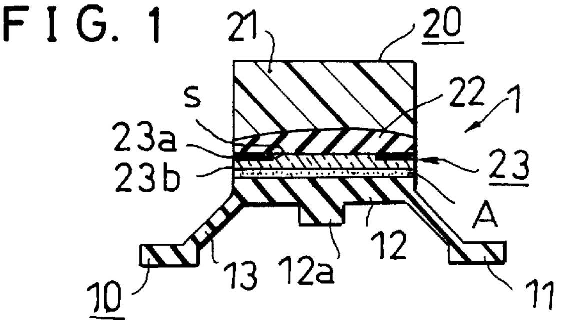
FIG. 1 is a fragmentary schematic sectional view showing an essential part of an embodiment of a cover member for an illuminated push button switch according to the present invention.

First, a cover member of the illustrated embodiment will be described with reference to FIG. 1. The cover member which is generally designated at reference numeral 1 in FIG. 1 includes a substrate 10 and a plurality of key tops 20 fixed on the substrate 10. The substrate 10 includes a base section 11 acting as a support through which it is supported on a circuit board and a plurality of movable sections 12 successively formed on the base section 11 through skirts 13. The movable sections 12 each are formed at a central portion of a rear surface thereof with a contact mount portion **12*a* in a manner to be downwardly projected therefrom. The movable sections 12 of the substrate 10 each have a key top 20 fixed on an upper surface thereof and the contact mount portion 12*a* is mounted thereon with a movable contact (not shown) made of a conductive rubber material or the like. The substrate 10** is made of a light-permeable elastomeric rubber composition such as silicone rubber or the like by injection molding so as to have shore hardness A of 30 to 65.

The key tops 20 each include a resin section 21 formed into a substantially column-like shape and a rubber section 22 arranged on one end surface of the resin section 21. The rubber section 22 has a fixed surface through which the key top 20 is fixed on the substrate 10. The fixed surface of the rubber section 22 is formed thereon with a symbol/character display section 23. The resin section 21 is made by injecting a light-permable hard resin composition such as acrylic resin or the like into each of molding or forming recesses of a molding or forming die and heating it without applying a pressure thereto to cure it into Shore hardness D of 50 to 80. The rubber section 22 is formed into substantially the same outer configuration in plan as the resin section 21 or substantially the same diameter as the resin section 21. Also, the rubber section 22 is formed into a layer-like or laminar configuration and so as to have hardness of a level, for example, between hardness of the resin section 21 and that of the substrate 10 and preferably Shore hardness A of 60 to 80. The rubber section 22 is made by charging a light-permable rubber composition such as silicone rubber or the like onto the resin section 21 cured in each of the forming recesses of the forming die and then subjecting it to heating while pressuring it.

The symbol/character display section 23 includes a light-shielding colored layer **23*a* and a light-permeable colored layer 23*b* which are laminated on each other. The light-shielding colored layer 23*a* is provided with a punched character hole s, which provides a character or symbol of a plane configuration. The light-shielding colored layer 23*a* is made by subjecting an ink of light-shielding resin mixed with a black pigment such as carbon black or the like to screen printing or the like. The light-permeable colored layer 23*b* is made by laminating an ink of light-permeable resin mixed with a white pigment such as titanium oxide or the like and a colored pigment on the light-shielding colored layer 23*a*** by screen printing and then curing it.

Now, manufacturing of the cover member 1 will be described with reference to FIGS. 2A to 2D. First, a molding or forming die 31 formed with at least one set of molding or forming recesses 31*a* is provided. The forming recesses 31*a* of the forming die 31 each are charged therein with a light-permeable hard resin composition P in the form of liquid by means of a dispenser 32. Then, the resin composition P in each of the forming recesses 31*a* is heated without being pressurized, resulting in being cured, leading to formation of the resin section 21 in the forming recess 31*a* (see FIGS. 3A and 3B). The resin section 21 is so formed that an upper surface thereof is recessed due to surface tension of the liquid resin composition and the like.

The resin composition P may be made by mixing thermosetting resin with a vinyl monomer, epoxy resin or the like and the resin section 21 may be made so as to have Shore D hardness of 50 to 80.

Figure 2A:
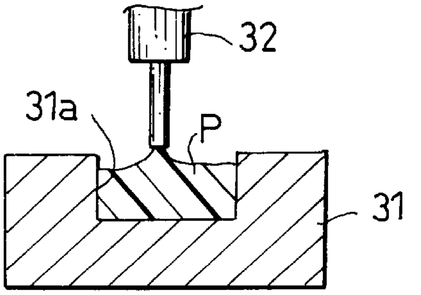
FIGS. 2A to 2D each are a schematic sectional view showing each of steps in manufacturing of a key top of the cover member of FIG. 1.
Figure 2B:
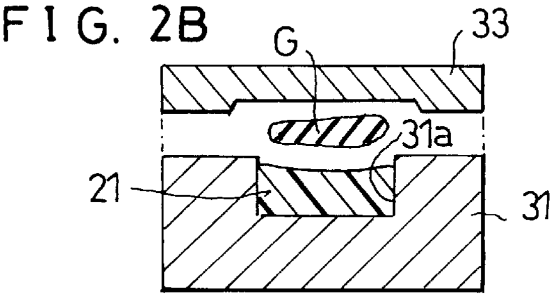
Figure 3A:
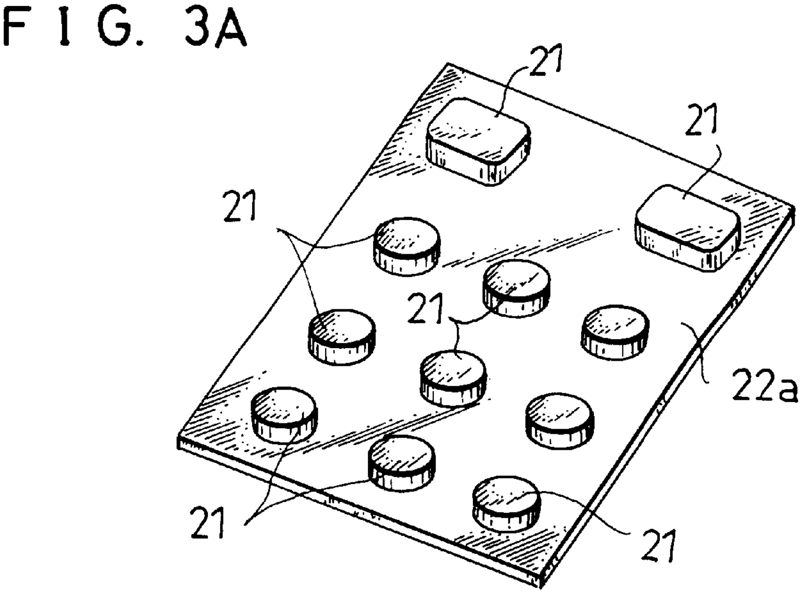
FIG. 3A is a schematic perspective view showing an intermediate or semi-finished product obtained in manufacturing of a key top of the cover member of FIG. 1.
Figure 3B:
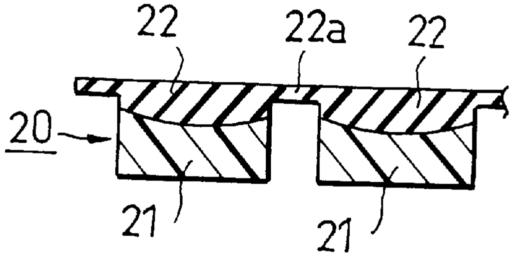
FIG. 3B is a fragmentary enlarged sectional view of the semi-finished product shown in FIG. 3A.

After the resin section 21 is cured in the forming recess 31*a*, a clay-like rubber composition G is placed on the resin section 21 received in the forming recess 31*a* and then heated while being pressurized by means of the forming die 31 and a top force 33 for rubber molding, resulting in the rubber section 22 being formed, as shown in FIG. 2B. The rubber section 22 thus formed, as shown in FIGS. 3A and 3B, is firmly fixed to the recessed upper surface of each of the plural resin sections 21 while being contiguous thereto through a burr 22*a*, so that a fixed surface thereof which is a surface thereof opposite to a surface thereof fixed to the resin 21 is rendered flat.

Figure 2C:
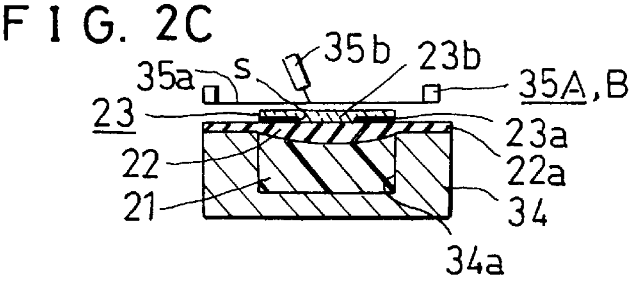

Then, as shown in FIG. 2C, a semi-finished product including a plurality of the resin sections 21 and rubber sections 22 which are integrally and successively connected to each other through the burr 22*a* is held by means of a positioning fixture 34 for printing. The positioning fixture 34 includes a plurality of positioning recesses 34*a*, in which the resin sections 21 fixed to the rubber sections 22 are received, respectively, while keeping the rubber sections 22 facing up, so that the semi-finished product may be held at a predetermined position. Then, the rubber sections 22 held in the positioning fixture 34 each are formed thereon with the symbol/character display section 23.

Formation of the symbol/character display section 23 is carried out by forming the light-shielding colored layer 23*a* by means of a screen printing machine 35A and then laminatedly forming the light-permeable colored layer 23*b* on the light-shielding colored layer 23*a* by means of a screen printing machine 35B. The light-shielding colored layer 23*a* is made of a resin composition containing carbon black and the like and formed with the punched hole s indicating a character, a symbol or the like. The light-permeable colored layer 23*b* is made of a white pigment or a light-permeable resin composition and charged in the punched hole s of the heat-shielding colored layer 23*a*. The screen printing machines 35A and 35B each may include a screen 35*a* and a squeegee 35*b*, as widely known in the art.

Figure 2D:
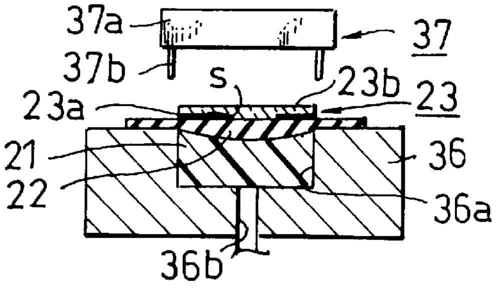

Then, the semi-finished product including the resin sections 21 and rubber sections 22 integrally connected to each other is removed from the positioning fixture and then held on a holding fixture 36. The holding fixture 36, as shown in FIG. 2D, includes a plurality of holding recesses 36*a* which permit the plural resin sections 21 to be fitted therein and a plurality of suction holes 36*b* each formed therethrough so as to extend between an outer surface of the holding fixture 36 and a bottom of each of the holding recesses 36*a*. The suction holes 36*b* each are connected through a control valve or the like to an external vacuum source (not shown). Thus, the holding fixture 36 so functions that the plural resin sections 21 connected to each other through the burr 22*a* are fitted in the holding recesses 36*a* and securely held therein by suction obtained through the suction holes 36*b*, respectively.

Figure 4:
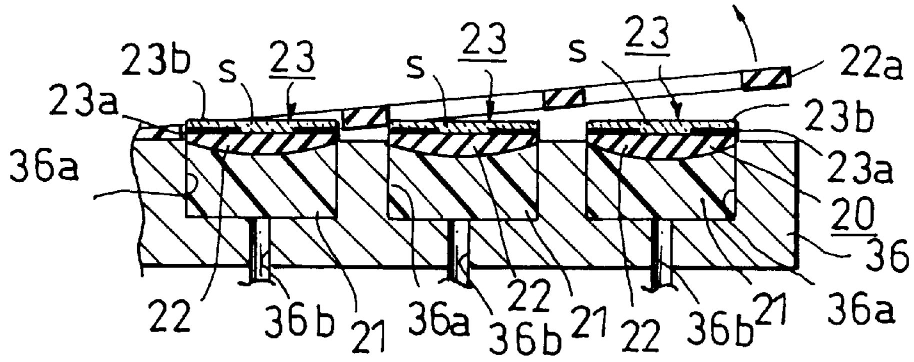
FIG. 4 is a fragmentary schematic sectional view showing a last step in manufacturing of a key top of the cover member of FIG. 1.

Then, the rubber sections 22 held in the holding fixture 36 are cut at predetermined position thereof by means of a cutter 37. The cutter 37 includes a holder 37*a* and a plurality of blades 37*b* fixed on the holder 37*a*. The blades 37 each are formed into a frame-like shape substantially identical with a plane contour of the resin section 21. This results in the rubber sections 22 being cut into substantially the same configuration as the resin sections as shown in FIG. 4. Then, the burr 22*a* is removed as indicated at an arrow in FIG. 4, so that the key tops 20 may be completed.

Figure 5A:
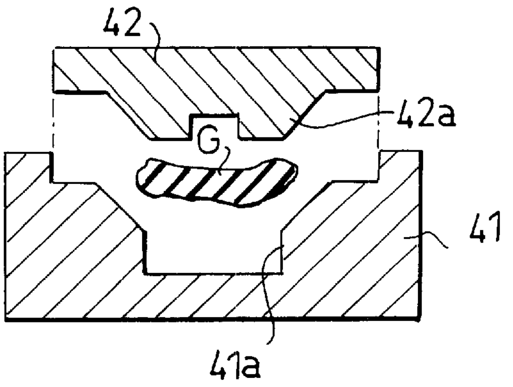
FIG. 5A to 5C are schematic sectional views showing steps in manufacturing of the key top subsequent to the steps shown in FIGS. 2A to 2D, respectively.

Now, manufacturing of the substrate 10 will be described hereinafter. The substrate 10 is formed by means of a bottom force 41 and a top force 42 for formation of the substrate as shown in FIG. 5A. The bottom force 41 includes a forming recess 41*a* for specifying or determining a front surface configuration of the substrate 10 and the top force 42 includes a forming projection 42*a* for specifying or determining a rear surface configuration of the substrate 10. Then, as shown in FIG. 5A, the forming recess 41*a* of the bottom force 41 is charged therein with a clay-like rubber composition such as, for example, the rubber composition G used for formation of the rubber section 22. Then, the rubber composition in the recess 41*a* is pressurized and heated for formation by means of the top force 42. A composition such as silicone rubber as described above may be used as the rubber composition.

Figure 5B:
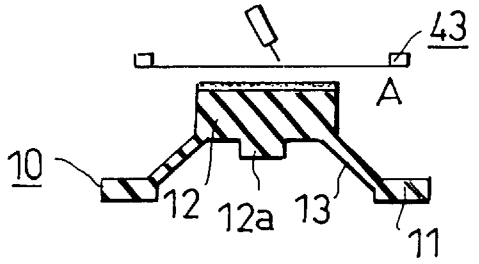
Figure 5C:
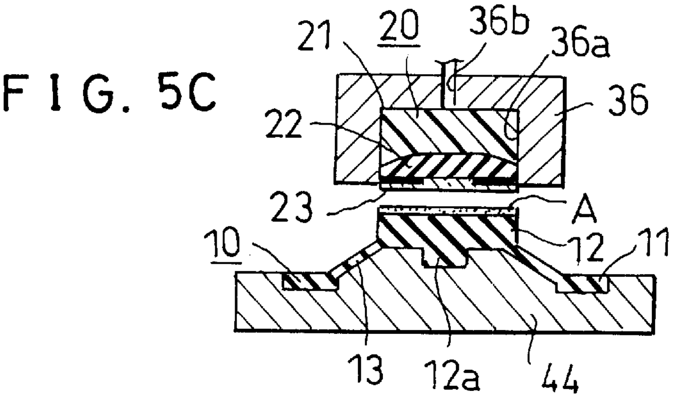

Then, the substrate 10 thus formed is removed from the bottom force 41 by release and then held on a predetermined position by means of a fixture or the like as shown in FIG. 5B, followed by application of a transparent adhesive A to an upper surface of each of the movable sections 12 of the substrate 10 by means of a screen printing machine 43. Subsequently, as shown in FIG. 5C, the substrate 10 is held at a predetermined location by means of a positioning fixture 44 for adhesion, followed by movement of the key tops 20 held by the holding fixture 36 to a position above the corresponding movable sections 12 of the substrate 10. Thereafter, the fixed surface of the rubber section 22 of each key top 20 on which the light-permeable colored layer 23*b* is formed is adhered to an upper surface of the movable section 12 corresponding thereto, resulting in each key top 20 being fixed onto the corresponding movable section 12 of the substrate 10. Also, a movable contact is mounted on each of the contact mount portions 12*a*, leading to completion of the cover member 1.

In the illustrated embodiment, as described above, the hard resin section 21 is formed and then the rubber section 22 is securely laminatedly formed on the resin section 21. Then, the symbol/character display section 23 which includes the light-shielding colored layer 23*a* and light-permeable colored layer 23*b* is formed on the flat surface of the rubber section 22 by screen printing or the like, to thereby provide the key top 20. Such construction facilitates formation of the symbol/character display section 23. More specifically, the rubber section 22 has one surface formed to be flat, so that formation of the symbol/character display section 23 by screen printing or the like is facilitated while being substantially free from any defect and the like.

Then, the surface of the rubber section 22 of each key top 20 on which the symbol/character display section 23 is formed is adhered to the top surface of each movable section 12 of the substrate 10 by means of an adhesive, so that the cover member 1 is completed. The adhesion is firmly and readily attained because the surface of the rubber section 22 on which the symbol/character display section 23 is arranged is formed to be flat.

In particular, in the illustrated embodiment, the rubber section 22 is formed so as to have hardness set between hardness of the substrate 10 and that of the resin section 21. More specifically, the substrate 10, resin section 21 and rubber section 22 are formed into Shore A hardness of 30 to 65, Shore D hardness of 50 to 80 and Shore A hardness of 60 to 80, respectively. Such construction effectively prevents peeling at an interface between the rubber section 22 and the resin section 21 fixed to each other and at that between the rubber section 22 and the substrate 10 fixed to each other due to long-term service, a variation in temperature and the like. Also, it provides the cover member 1 with satisfactory durability and ensures suitable release of pressing force during operation and an excellent feeling in operation. More specifically, such construction reduces a difference in hardness and therefore elastic characteristics and elastic coefficient between each two members bonded to each other, to thereby minimize a difference in deformation and strain between the members. This reduces occurrence of stress at the interface, to thereby improve resistance to fatigue of the cover member 1 and therefore durability thereof.

Figure 6:
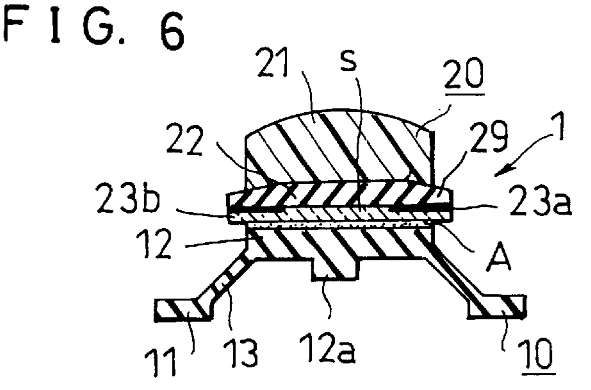
FIG. 6 is a schematic sectional view showing a part of another embodiment of a cover member for an illuminated push button switch according to the present invention.

Referring now to FIG. 6, another embodiment of a cover member for an illuminated push button switch according to the present invention is illustrated. In a cover member 1 of the illustrated embodiment, key tops 20 each are so formed that a rubber section 22 is formed into an outer diameter larger than that of a resin section 21. More particularly, the rubber section 22 is formed with a flange 29 in a manner to radially outwardly extend from a lower end of an outer periphery of the resin section 21. The flange 29 may be formed by suitably adjusting a configuration of the blade 37*b* of the cutter 37 used in the embodiment described above with reference to FIGS. 1 to 5C. The flange 29 is desirably formed so as to be projected by a distance of about 0.2 to 0.5 mm from the outer periphery of the resin section 21. Also, it is desirably formed into a thickness of about 0.3 to 1.0 mm.

When the cover member 1 of the illustrated embodiment is mounted on a casing of a portable telephone, the flange 29 closes a gap between the key tops 20 and the casing to effectively prevent leakage of light from the casing and intrusion of water or the like into the casing, resulting in the cover member 1 exhibiting increased sealing characteristics. In general, a casing on which the cover member 1 is mounted is formed with a plurality of holes corresponding to the key tops 20. In order to project the key tops 20 from an inside of the casing, the flange 29 of each of the key tops 20 is tightly contacted with a peripheral edge of each of the holes on an inner surface of the casing, to thereby exhibit an increased sealing function.

As can be seen from the foregoing, the cover member of the present invention is so constructed that the key tops each are provided at the distal end thereof with the hard resin section. The resin section is integrally mounted thereon with the rubber section and then the symbol/character display section is formed on the flat surface of the rubber section. The rubber section is fixed on the surface thereof on which the symbol/character display section is fixed to the movable section of the substrate. Such construction provides a user with a satisfactory feeling in operation, effectively prevents wearing of the symbol/character display section, provides the symbol/character display section with an aesthetic appearance without any defect and ensures increased durability of the cover member, resulting in a commercial value of the cover member being highly increased.

Also, in the present invention, the rubber section may be formed with the flange so as to radially outwardly extend from) the outer periphery of the resin section. Such construction, when the cover member is mounted on a casing of a portable telephone or the like, effectively prevents outward leakage of light emitted from an LED or the like arranged in the casing, resulting in the cover member exhibiting increased sealing characteristics.

Further, the cover member of the present invention may be so constructed that the rubber section is made of a rubber material having hardness of a level between hardness of the substrate and that of the resin section. This effectively prevents peeling or breakage at the interface therebetween due to long-term service, a variation in temperature and the like, permits the cover member to exhibit satisfactory durability, and ensures suitable release of pressing force during operation and an excellent feeling in operation.

The invention will be understood more readily with reference to the following examples; however, these examples are intended to illustrate the invention and are not to be construed to limit the scope of the invention.

EXAMPLE 1

A composition shown in Table 1 was used as a high-hardness thermosetting resin material for the resin section 21 of each of the key tops 20. The composition was mixed, stirred and charged in the forming recesses 31*a* of the forming die 31 heated to 130° C. by means of the air dispenser 32. Then, the composition was left to stand for 2 minutes, resulting in being cured.

TABLE 1

| Composition | Parts by weight |
|---|---|
| Unsaturated polyester*1 | 100 |
| Vinyl monomer*2 | 40 |
| Epoxy resin*3 | 40 |
| Melamine resin*4 | 15 |
| Radical curing agent*5 | 0.5 |
| Oxidation catalyst*6 | 0.5 |

*1Unsaturated polyester sold under a tradename "Polylite" by DAINIPPON INK AND CHEMICALS, INC.
*2Vinyl monomer sold under a tradename "Daiso Dap Monomer" by DAISO CO., LTD.
*3Epoxy resin sold under a tradename "Epolite" by Kyoeisha Kagaku Kabushiki Kaisha
*4Melamine resin sold under a tradename "Cymel 303" by Mitsui Cyanamide Kabushiki Kaisha
*5Radical curing agent sold under a tradename "Nibar BO" by NOF CORP.
*6Oxidation catalyst sold under a tradename "Catalyst 4040" by Mitsui Cyanamide Kabushiki Kaisha Then, after the resin was cured to form the resin sections 21, a silicone rubber composition shown in Table 2 was poured onto the resin sections 21 received in the forming recesses 31*a* of the forming die 31 to integrally form the rubber sections 22 under conditions of 165° C. in forming temperature, 200 kgf/cm$^2$ in forming pressure and 2 minutes in forming time by means of the top force 33 for rubber formation. A thus-obtained product wherein the resin sections 21 and rubber sections 22 are formed integrally with each other included 14 such resin sections 21. Dimensions of the rubber sections 22 including the burr 22*a* were 100 mm×50 mm and 0.5 mm in thickness. The resin sections 21 had Shore D hardness of 75 and the rubber sections 22 had shore A hardness of 60.

TABLE 2

| Silicone rubber composition | Parts by weight |
|---|---|
| Silicone rubber compound*7 | 100 |
| Curing agent*8 | 0.5 |

*7Silicone rubber compound sold under a tradename "DY32-379U" by Toray Dow Corning Silicone Kabushiki Kaisha
*8Curing agent sold under a tradename "RC-8" by Toray Dow Corning Silicone Kabushiki Kaisha Then, the integrally formed product was fixed on the positioning fixture 34 for printing and then the light-shielding colored layers 23*a* each formed with the punched hole s were formed on the product by screen printing using a silicone ink sold under a tradename "Silmark BLM" sold by Shin-Etsu Chemical Co., Ltd. Then, light-permeable a white silicone ink sold under a tradename "KTP Ink-W" by Shin-Etsu Chemical Co., Ltd. was charged in the punched holes s of the light-shielding colored layers 23*a* by allover printing, to thereby form the symbol/character display sections 23.

Then, the resin sections 21 of the product were fitted in the recesses 36*a* of the holding fixture 36 and forced into the recesses by suction to securely hold the product on the holding fixture 36. Subsequently, the cutter 37 was used to cut the burr 22*a*, which was then removed. Each key top 20 including the resin section 21 and rubber section 22 was kept held on the holding fixture 36 still after removal of the burr 22*a*.

The substrate 10 was made of a silicone rubber composition shown in Table 3.

TABLE 3

| Silicone rubber composition | Parts by weight |
|---|---|
| Silicone rubber compound*9 | 100 |
| Curing agent*10 | 2 |

*9Silicone rubber compound sold under a tradename "KE-951U" by Shin-Etsu Chemical Co., Ltd.
*10Curing agent sold under a tradename "C-8" by Shin-Etsu Chemical Co., Ltd.

The silicone rubber compound was charged in the recesses 41*a* of the bottom force 41 and then subject to molding or forming under conditions of 170° C. in forming temperature, 200 kgf/cm$^2$ in forming pressure and 3 minutes in forming time by means of the top force 42, to thereby form the substrate 10 including a plurality of the movable sections 12. The substrate had Shore A hardness of 50. Then, a transparent silicone adhesive sold under a tradename "KE-1934A/B" by Shin-Etsu Chemical Co., Ltd. was applied in a thickness of 20 $\mu$m to the top surface of each of the movable sections 12 of the substrate 10.

Then, the substrate 10 was fixed on the positioning fixture for adhesion and the symbol/character display section 23 of each of the key tops 20 was adhered to the top surface of each of the movable sections 12. Then, the holding fixture 36 was removed by releasing it from suction. Then, the substrate 10 was placed in a heating oven at 180° C. for 5 minutes while keeping the key tops 20 adhered thereto, to thereby carry out adhesion and curing, resulting in the cover member 1 being provided.

EXAMPLE 2

A composition shown in Table 4 was used as a high-hardness thermosetting resin material for the resin section 21 of each of the key tops 20. The composition was charged in the forming recesses 31*a* of the forming die 31 heated to 150° C. by means of the air dispenser 32. Then, the composition was left to stand for 30 minutes, to thereby be cured, resulting in the resin sections 21 being formed.

TABLE 4

| Composition | Parts by weight |
|---|---|
| High-hardness silicone resin*11 | 100 |
| Coloring agent*12 | 1 |

*11High-hardness silicone resin sold under a tradename "KJR 618" by Shin-Etsu Chemical Co., Ltd.
*12Coloring agent sold under a tradename "STVX 683" by DAIN-ICHISEIKA COLOUR & CHEMICALS MFG. CO., LTD.

After the resin sections 21 were cured, a silicone rubber composition of the same formulation as that in Example 1 was charged onto the resin sections held in the forming recesses 31*a* of the forming die 31 and subject to molding under conditions of 65° C. in forming temperature, 200 kgf/cm$^2$ in forming pressure and 2 minutes in forming time by means of the top force 33, resulting in the rubber sections 22 being integrally formed on the resin sections 21, leading to formation of an integrally formed product. The product included 14 such resin sections. A size of the rubber sections 22 including the burr 22*a* was 100 mm×50 mm×0.5 mm. The resin sections 21 had Shore D hardness of 70 and the rubber sections 22 had Shore A hardness of 60. Then, the product was fixed on the positioning fixture 34 for printing and the light-shielding colored layer 23*a* and light-permeable colored layer 23*b* were formed of the same inks as those in Example 1, to thereby provide the symbol/character sections 23.

Then, the resin sections 21 of the integrally formed product were fitted in the recesses 36*a* of the holding fixture 36 and then the product was securely held on the holding fixture 36 by subjecting the resin sections 21 to suction. Subsequently, the product was cut by means of the cutter 37, to form the burr 22*a* around each of the resin sections into a size larger by 0.3 mm than the resin section 21, resulting in removing the remaining burr while leaving the flange 29. The key tops 20 each including the resin section 21 and rubber section 22 were kept held on the holding fixture 36 also after removal of the burr 22*a*.

The substrate 10 was formed of a silicone rubber composition shown in Table 5 according to substantially the same procedure as in Example 1. More particularly, the composition was charged in the recesses 41*a* of the bottom force 41 and formed by means of the top force 42 under conditions of 165° C. in forming temperature, 200 kgf/cm$^2$ in forming pressure and 2 minutes in forming time, to thereby obtain the substrate 10. Then, the same adhesive as used in Example 1 was applied to the top surface of each of the movable sections 12 of the thus-formed substrate 10 by screen printing, to thereby provide the key top 20. The substrate 10 had Shore A hardness of 60.

TABLE 5

| Silicone rubber composition | Parts by weight |
|---|---|
| Silicone rubber compound*13 | 100 |
| Curing agent*14 | 0.5 |

*13Silicone rubber compound sold under a tradename "DY32-6014U" by Toray Dow Corning Silicone Kabushiki Kaisha
*14Curing agent sold under a tradename "RC-8" by Toray Dow Corning Silicone Kabushiki Kaisha Then, the substrate having the key tops 20 adhered thereto was placed in a drying oven at 180° C. for 5 minutes, resulting in the cover member 1 being provided.

The cover members 1 obtained in Examples 1 and 2 each provided the symbol/character display section 23 which permitted the character or the like to be clearly identified or recognized and exhibited satisfactory aesthetic appearance substantially without any blurring and color shading. Also, in each of the examples, the key tops 20 were firmly bonded to the substrate 10. In particular, the cover member 1 of Example 2 fully prevented leakage of light emitted by LEDs to an outside of a casing when it was mounted on the casing and ensured satisfactory sealing between the casing and the cover member 1.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A cover member for an illuminated push button switch, comprising:

a substrate made of a light-permeable elastomeric rubber material having a fixed portion and including a plurality of movable sections, said plurality of movable sections are movable relative to said fixed portion of said substrate; and key tops arranged on said movable sections of said substrate, respectively;

said key tops each including a rubber section made of a light-permeable elastomeric rubber material and a resin section on said rubber section made of a light-permeable hard resin material;

said rubber sections each being fixed on a surface of each of said movable sections of said substrate and provided on a surface thereof fixed to said movable section with a display section;

said resin sections each being fixed on a surface of said rubber section opposite to said surface therof on which said display section is formed.

2. A cover member as defined in claim 1, wherein said rubber sections fixed on said resin sections each include a flange arranged so as to radially outwardly extend from a lower end of an outer periphery of said resin section.

3. A cover member as defined in claim 1, wherein said rubber sections each have hardness set between hardness of said substrate and that of said resin section.

4. A cover member as defined in claim 2, wherein said rubber sections each have hardness set between hardness of said substrate and that of said resin section.

5. A cover member for an illuminated push button switch, comprising:

a substrate made of a light-permeable elastomeric rubber material having a fixed portion and including a plurality of movable sections, said plurality of movable sections are movable relative to said fixed portion of said substrate; and key tops arranged on said movable sections of said substrate; respectively;

said key tops each including a rubber section made of a light-permeable elastomeric rubber material and a resin section on said rubber section made of a light-permeable hard resin material;

said rubber section having a flat surface through which said rubber section is fixed on a surface of each of said movable sections of said substrate and provided on said flat surface thereof fixed onto said movable section with a display section;

said resin section being fixed on a surface of said rubber section opposite to said flat surface thereof on which said display section is formed;

said substrate, rubber section and resin section being made so as to have Shore A hardness of 30 to 65, Shore A hardness to 60 to 80 and Shore D hardness of 50 to 80 respectively.

6. A cover member as defined in claim 5, wherein said rubber section fixed on said resin section includes a flange arranged so as to radially outwardly extend from a lower end of an outer periphery of said resin section.

* * * * *